(12) United States Patent
Miwa et al.

(10) Patent No.: US 10,393,449 B2
(45) Date of Patent: Aug. 27, 2019

(54) HEAT STORAGE MEMBER

(71) Applicants: NGK INSULATORS, LTD., Nagoya (JP); NGK Adrec Co., Ltd., Kani-Gun (JP); TOKYO INSTITUTE OF TECHNOLOGY, Tokyo (JP)

(72) Inventors: Shinichi Miwa, Nagoya (JP); Toshiharu Kinoshita, Kani-Gun (JP); Iori Himoto, Kani-Gun (JP); Yukitaka Kato, Tokyo (JP); Jun Kariya, Tokyo (JP)

(73) Assignees: NGK Insulators, Ltd., Nagoya (JP); NGK Adrec Co., Ltd., Kani-Gun (JP); Tokyo Institute of Technology, Meguro-Ku (JP)

( * ) Notice: Subject to any disclaimer, the term of this patent is extended or adjusted under 35 U.S.C. 154(b) by 84 days.

(21) Appl. No.: 15/468,556

(22) Filed: Mar. 24, 2017

(65) Prior Publication Data
US 2017/0284746 A1 Oct. 5, 2017

(30) Foreign Application Priority Data
Mar. 31, 2016 (JP) ................. 2016-073353

(51) Int. Cl.
*F28D 20/00* (2006.01)
*C09K 5/16* (2006.01)

(52) U.S. Cl.
CPC .......... *F28D 20/003* (2013.01); *C09K 5/16* (2013.01); *F28D 2020/0017* (2013.01); *Y02E 60/142* (2013.01)

(58) Field of Classification Search
CPC .......... F28D 20/025; F28D 2020/021; F28D 2020/0069; F28F 9/026; F28F 9/0278; F28F 9/028
(Continued)

(56) References Cited

U.S. PATENT DOCUMENTS 4,408,659 A * 10/1983 Hermanns et al. ..... F28D 13/00
165/10
4,993,481 A * 2/1991 Kamimoto .......... C04B 38/0006
126/643
(Continued)

FOREIGN PATENT DOCUMENTS

DE 10 2014 206 035 A1 10/2014
JP 06144930 A * 5/1994
(Continued)

OTHER PUBLICATIONS

European Office Action (Application No. 17163128.6) dated Jul. 20, 2018.
(Continued)

*Primary Examiner* — Allen J Flanigan
(74) *Attorney, Agent, or Firm* — Burr & Brown, PLLC

(57) ABSTRACT

A heat storage member including a substrate containing a SiC sintered body as a principal ingredient and a heat storage material configured to store and radiate heat by a reversible chemical reaction with a reaction medium or a heat storage material configured to store and radiate heat by physical adsorption to a reaction medium and physical desorption from a reaction medium. The substrate has a three-dimensional network structure including a skeleton having porosity of 1% or less. A void ratio of a void formed in the three-dimensional network structure of the substrate is ranging from 30 to 95%. The heat storage material is disposed at least in a part of a surface of the void in the three-dimensional network structure of the substrate.

9 Claims, 5 Drawing Sheets

(58) Field of Classification Search
USPC .................................................. 165/10, 174
See application file for complete search history.

(56) References Cited

U.S. PATENT DOCUMENTS

| | | | |
|---|---|---|---|
| 5,338,576 | A | 8/1994 | Hanzawa et al. |
| 2010/0099547 | A1* | 4/2010 | Fukushima et al. .... B28B 1/007 |
| | | | 501/80 |
| 2010/0252248 | A1* | 10/2010 | Shimazu et al. ........ C04B 33/02 |
| | | | 165/185 |
| 2013/0213620 | A1* | 8/2013 | Miyazaki .................. F28F 7/02 |
| | | | 165/154 |

FOREIGN PATENT DOCUMENTS

| | | | |
|---|---|---|---|
| JP | 2011-027311 | A1 | 2/2011 |
| JP | 2011162746 | A * | 8/2011 |
| JP | 2013-112706 | A1 | 6/2013 |
| JP | 2015-040646 | A1 | 3/2015 |

OTHER PUBLICATIONS

Extended European Search Report (Application No. 17163128.6) dated Aug. 1, 2017.
Lijun Gu, et a., "Template-Synthesized Porous Silicon Carbide as an Effective Host for Zeolite Catalysts," *Chemistry—A European Journal*, vol. 15, Dec. 14, 2009, pp. 13449-13455 (XP-002583187).

* cited by examiner

Cross Section of Skeleton Cut Perpendicular to Longitudinal Direction

Cross Section of Skeleton Cut along Longitudinal Direction

HEAT STORAGE MEMBER

The present application is an application based on JP-2016-73353 filed on Mar. 31, 2016 with Japan Patent Office, the entire contents of which are incorporated herein by reference.

BACKGROUND OF THE INVENTION

Field of the Invention

The present invention relates to a heat storage member. More specifically, the present invention relates to a heat storage member capable of achieving highly-responsive heat radiation and heat absorption by a chemical reaction or physical adsorption and physical desorption between a heat storage material and a reaction medium.

Description of the Related Art

In the related art, the following technique has been proposed. That is, exhaust heat from an automobile and the like is recovered and stored by using a heat storage material, and the recovered and stored heat is utilized to activate a catalyst (a catalyst for disposing exhaust gas) when starting an engine (see Patent Documents 1 to 3). According to such a technique, the heat storage material radiates the recovered and stored heat so that it is possible to early heat the catalyst for disposing exhaust gas and to reduce a time for activating the catalyst. For example, a heat storage device disclosed in Patent Document 1 applies a chemical heat storage material, as the heat storage material, configured to store and radiate heat by a reversible chemical reaction with a reaction medium.

Herein, the chemical heat storage material is referred to as a material capable of absorbing and radiating heat by a chemical reaction. Hereinafter, "chemical heat storage" in the present disclosure is referred to as absorption and radiation of heat by a chemical reaction. The chemical heat storage using the chemical heat storage material has such an advantage that the heat can be stored at relatively high density for a long time and can be reused.

On the other hand, commonly, a potential for a heat pump utilizing physical adsorption and physical desorption of water with respect to zeolite has been shown, and research and development of such a heat pump have been promoted toward a practical application. However, in putting such a heat pump to practical use, efficiency may deteriorate due to low thermal conductivity of the zeolite. Furthermore, a potential for a heat pump utilizing physical adsorption and physical desorption of $NH_4$ with respect to magnesium chloride ($MgCl_2$) has been shown. However, efficiency may deteriorate due to low thermal conductivity of the magnesium chloride.

The heat storage device disclosed in Patent Document 1 applies calcium oxide (CaO) and the like as the heat storage material. Adding water to calcium oxide forms calcium hydroxide ($Ca(OH)_2$) and radiates heat of reaction at the same time. In other words, this reaction is called an exothermic reaction. On the other hand, adding heat to calcium hydroxide causes dehydration reaction of the calcium hydroxide and forms calcium oxide (CaO) and water ($H_2O$). This reaction is called an endothermic reaction. The aforementioned chemical reactions in calcium oxide (or in calcium hydroxide) are reversible. The endothermic reaction is used to recover the exhaust heat, and the exothermic reaction is used to radiate the heat from the chemical heat storage material.

[Patent Document 1] JP 2011-27311 A
[Patent Document 2] JP 2013-112706 A
[Patent Document 3] JP 2015-40646 A

SUMMARY OF THE INVENTION

As mentioned above, chemical heat storage has such an advantage that heat can be stored at relatively high density for a long time and can be reused. However, a chemical heat storage device using a chemical heat storage material has a problem, that is, low responsiveness of heat generation and heat absorption. It is desirable to promptly generate the heat up to a catalyst activating temperature especially when the chemical heat storage device is used to heat a catalyst at engine startup. However, it is difficult for the conventional chemical heat storage device to generate the heat promptly.

The reason for the difficulty in generating the heat promptly is low thermal conductivity of the chemical heat storage material. In other words, an exothermic reaction of the chemical heat storage material advances when the chemical heat storage material is brought into contact with a reaction medium. However, due to the low thermal conductivity of the chemical heat storage material, it takes time to radiate the generated heat. Furthermore, the generated heat is transferred to the chemical heat storage material in a non-reacting part, which deteriorates reactivity (reactivity of the exothermic reaction) of the chemical heat storage material in the non-reacting part. For example, in a case where the chemical heat storage material has a particulate shape, the exothermic reaction is saturated in the vicinity of a surface of the particulate chemical heat storage material, which makes it difficult to generate the heat sufficiently and promptly.

The reason for the aforementioned difficulty in generating the heat promptly also includes low responsiveness of the heat generation and heat absorption of the chemical heat storage material. For example, in a case of using calcium oxide as the chemical heat storage material, the exothermic reaction of the calcium oxide advances as follows. In the exothermic reaction in which water is reacted with the calcium oxide, the calcium oxide and water are quickly brought into contact on a surface of the solid calcium oxide so that the exothermic reaction advances relatively promptly. On the other hand, in an inside of the solid calcium oxide, water adhering to the surface of the calcium oxide diffuses into the inside of the calcium oxide and the diffusing water reacts with the calcium oxide. Therefore, a desired time is required to start the exothermic reaction inside the solid calcium oxide. This is presumed to be a factor of deteriorating the responsiveness of the heat generation and heat absorption of the chemical heat storage material.

The present invention has been made in light of such problems. According to the present invention, there is provided a heat storage member capable of achieving highly-responsive heat radiation and heat absorption by a chemical reaction between a heat storage material and a reaction medium.

According to the present invention, the following heat storage member can be provided.

According to a first aspect of the present invention, a heat storage member is provided and includes, a substrate containing a SiC sintered body as a principal ingredient, and a heat storage material configured to store and radiate heat by a reversible chemical reaction with a reaction medium, or a heat storage material configured to store and radiate heat by physical adsorption to a reaction medium and physical desorption from a reaction medium, wherein the substrate has a three-dimensional network structure including a skeleton having porosity of 1% or less, a void ratio of the three-dimensional network structure of the substrate is ranging from 30 to 95%, and the heat storage material is disposed at least in a part of a surface of a void in the three-dimensional network structure of the substrate.

According to a second aspect of the present invention, the heat storage member according to the first aspect is provided, wherein the substrate has a content ratio of SiC in the skeleton ranging from 40 to 99.7% by mass, excluding an impure ingredient inevitably contained in a raw material.

According to a third aspect of the present invention, the heat storage member according to the first or second aspects is provided, wherein a content ratio of metal Si in the skeleton is ranging from 5 to 60% by mass.

According to a fourth aspect of the present invention, the heat storage member according to any one of the first to third aspects is provided, wherein the substrate is a three-dimensional network structure.

According to a fifth aspect of the present invention, the heat storage member according to the fourth aspect is provided, wherein the three-dimensional network structure includes a first end face and a second end face opposing each other, a density of the skeleton included in the three-dimensional network structure differs between a first cross section including a direction from the first end face to the second end face and a second cross section including a direction perpendicular to the first cross section, and the density of the skeleton in a cross section having higher density of the skeleton among the first cross section and the second cross sections is 1 to 10 times as large as the density of the skeleton in a cross section having lower density of the skeleton.

According to a sixth aspect of the present invention, the heat storage member according to any one of the first to fifth aspects is provided, wherein the skeleton included in the three-dimensional network structure includes a protrusion in a surface of the skeleton.

According to a seventh aspect of the present invention, the heat storage member according to any one of the first to sixth aspects is provided, wherein the heat storage material includes at least one selected from the group consisting of oxides of Mg, Ca, Sr, Ba, hydroxides of Mg, Ca, Sr, Ba, carbonates of Mg, Ca, Sr, Ba, chlorides of Mg, Ca, Sr, Ba, sulfates of Mg, Ca, Sr, Ba, and zeolite.

According to an eighth aspect of the present invention, the heat storage member according to any one of the first to seventh aspects is provided, wherein the heat storage material is a particulate having an average particle diameter ranging from 5 nm to 100 µm.

According to a ninth aspect of the present invention, the heat storage member according to any one of the first to eighth aspects is provided, wherein a surface layer of the substrate includes a surface layer containing an ingredient different from that of the substrate.

A heat storage member according to an embodiment of the present invention includes a substrate containing a SiC sintered body as a principal ingredient, and a heat storage material configured to store and radiate heat by a reversible chemical reaction with a reaction medium, or a heat storage material configured to store and radiate heat by physical adsorption to a reaction medium and by physical desorption from a reaction medium. In the heat storage member according to an embodiment of the present invention, the substrate has a three-dimensional network structure including a skeleton having porosity of 1% or less, and a void ratio of the three-dimensional network structure of the substrate is ranging from 30 to 95%. In the heat storage member according to an embodiment of the present invention, the heat storage material is disposed in an inner surface of a void in the three-dimensional network structure of the substrate. According to the heat storage member of an embodiment of the present invention, it is possible to achieve highly-responsive heat radiation and heat absorption by a chemical reaction between the heat storage material and reaction medium.

In other words, the heat storage member according to an embodiment of the present invention includes the heat storage material disposed in the "substrate containing the SiC sintered body as the principal ingredient" having excellent thermal conductivity. Therefore, heat generated by an exothermic reaction of the heat storage material can be promptly transferred to the substrate (in other words, the heat generated by the exothermic reaction can be discharged to the substrate) so that it is difficult to maintain a high-temperature state of the heat storage material and it is possible to preferably advance the exothermic reaction of the heat storage material. With regard to an endothermic reaction, it is possible to preferably advance the endothermic reaction of the heat storage material by preferably transferring the heat between the heat storage material and substrate.

Furthermore, according to the heat storage member of an embodiment of the present invention, by employing the substrate including the three-dimensional network structure having the void ratio of 30 to 95%, it is possible to increase an area of the "inner surface of the void" in which the heat storage material is disposed. Therefore, it is possible to obtain a sufficient contact area between the heat storage material and reaction medium. Accordingly, in the heat storage member of an embodiment of the present invention, it is possible to achieve heat radiation and heat absorption with high responsiveness and high reactivity of the exothermic reaction and endothermic reaction of the heat storage material.

DESCRIPTION OF THE PREFERRED EMBODIMENTS

An embodiment of the present invention will hereinafter be described, but the present invention should not be restricted thereto. Accordingly, the following embodiment can be appropriately changed or modified within the gist of the present invention based on common knowledge of those skilled in the art. It should be understood that those changed or modified embodiments are also within the scope of the present invention.

Figure 1:
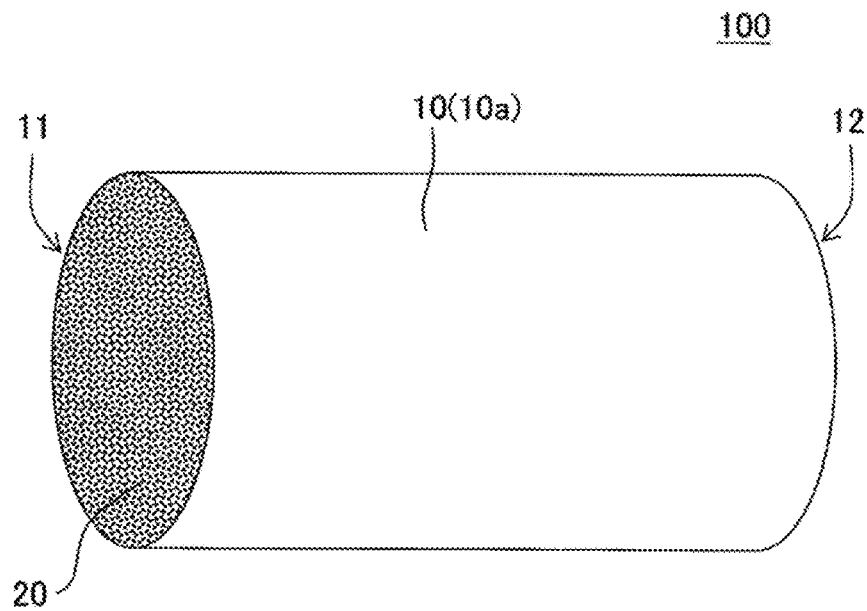
FIG. 1 is a perspective view schematically showing a heat storage member according to an embodiment of the present invention.
Figure 2:
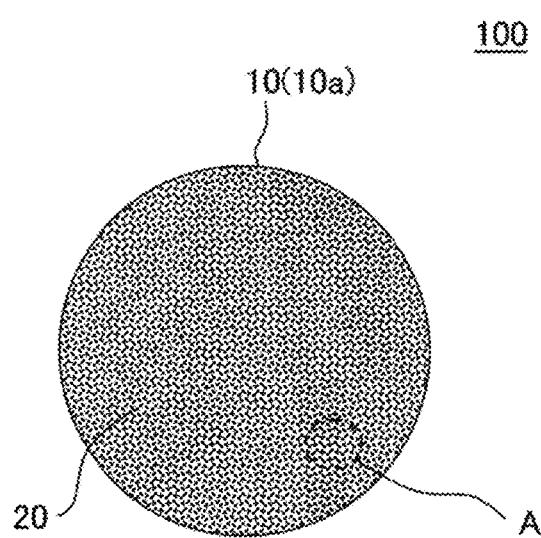
FIG. 2 is a cross sectional view schematically showing a cross section, perpendicular to a direction from a first end face to a second end face, of the heat storage member shown in FIG. 1.
Figure 3:
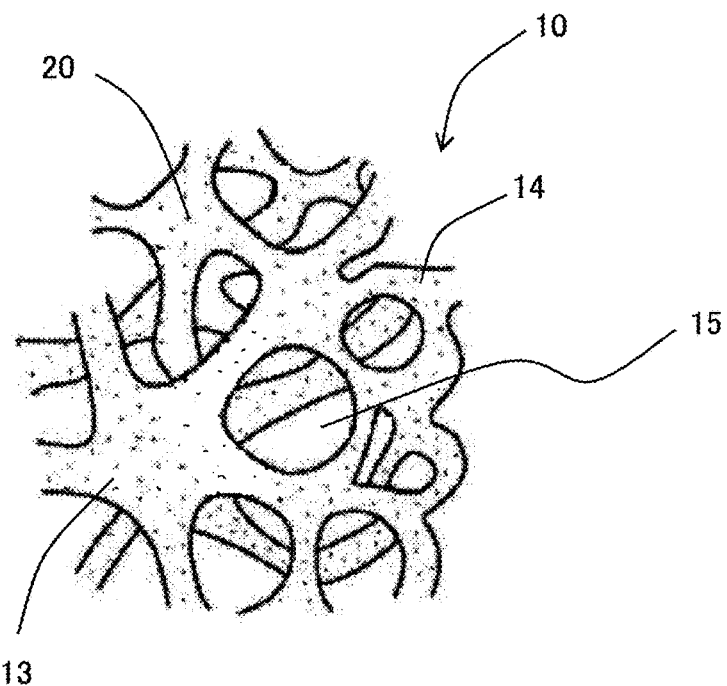
FIG. 3 is an enlarged schematic view enlarging a range shown by A in the heat storage member shown in FIG. 2.

(1) Heat Storage Member:

A heat storage member according to an embodiment of the present invention is a heat storage member 100 shown in FIGS. 1 to 3. The heat storage member 100 of the present embodiment includes a substrate 10 containing a SiC sintered body 10a as a principal ingredient and a heat storage material 20 configured to store and radiate heat by a reversible chemical reaction with a reaction medium. The heat storage member 100 of the present embodiment satisfies the following structures (a) to (c). (a) The substrate 10 has a three-dimensional network structure 14 including a skeleton 13 having porosity of 1% or less. (b) A void ratio of the three-dimensional network structure 14 of the substrate 10 is ranging from 30 to 95%. (c) The heat storage material 20 is disposed in an inner surface of a void 15 in the three-dimensional network structure 14 of the substrate 10. FIG. 1 and FIG. 2 each show an example that the substrate 10 has a round pillar shape including a first end face 11 and second end face 12.

According to the heat storage member 100 of the present embodiment, it is possible to achieve highly-responsive heat radiation and heat absorption by the chemical reaction between the heat storage material 20 and reaction medium. In other words, in the heat storage member 100 of the embodiment, the heat storage material 20 is disposed in the "substrate 10 containing the SiC sintered body as the principal ingredient" having excellent thermal conductivity. Therefore, heat generated by an exothermic reaction of the heat storage material 20 can be promptly transferred to the substrate 10 so that it is difficult to maintain a high-temperature state of the heat storage material 20 and it is possible to preferably advance the exothermic reaction of the heat storage material 20. With regard to an endothermic reaction, it is possible to preferably advance the endothermic reaction of the heat storage material 20 by preferably transferring the heat between the heat storage material 20 and substrate 10.

Furthermore, according to the heat storage member 100 of the embodiment, by employing the substrate 10 including the three-dimensional network structure 14 having the void ratio of 30 to 95%, it is possible to increase an area of the "inner surface of the void 15" in which the heat storage material 20 is disposed. Therefore, it is possible to obtain a sufficient contact area between the heat storage material 20 and reaction medium. Accordingly, it is possible to achieve heat radiation and heat absorption with high responsiveness and high reactivity of the exothermic reaction and endothermic reaction of the heat storage material 20.

Herein, FIG. 1 is a perspective view schematically showing the heat storage member according to an embodiment of the present invention. FIG. 2 is a cross sectional view schematically showing a cross section, perpendicular to a direction from the first end face to the second end face, of the heat storage member shown in FIG. 1. FIG. 3 is an enlarged schematic view enlarging a range shown by A in the heat storage member shown in FIG. 2.

Hereinafter, each structural element of the heat storage member of the embodiment will be described in detail.

(1-1) Substrate:

The substrate 10 used in the heat storage member 100 of the present embodiment is a carrier for dispersedly loading the heat storage material 20. The substrate 10 includes the SiC sintered body as the principal ingredient, more preferably a Si—SiC sintered body. In the substrate 10, the skeleton 13 has a structure with a three-dimensional network as shown in FIG. 3. In the present disclosure, the structure with the three-dimensional network of the skeleton 13 is referred to as the "three-dimensional network structure 14". The porosity of the skeleton 13 is 1% or less. Herein, the "substrate containing the SiC sintered body as the principal ingredient" indicates that a mass ratio of the "SiC sintered body" contained in the substrate is 40% by mass or more.

The heat storage member of the present embodiment is utilized for recovering and storing exhaust heat from an automobile and the like and for reusing the recovered and stored heat by radiating the heat as needed. The substrate used in the heat storage member of the present embodiment contains Si—SiC in which metal Si and SiC are compounded so that the substrate has high thermal resistance and high mechanical strength. As mentioned above, the substrate is excellent in thermal conductivity so that the exothermic reaction and endothermic reaction of the heat storage material can be preferably advanced by preferably transferring the heat between the heat storage material and the substrate.

Furthermore, the substrate containing the Si—SiC sintered body with excellent thermal conductivity is configured to have the three-dimensional network structure including the skeleton having the porosity of 1% or less so that it is possible to enhance "recovery efficiency of the exhaust heat" when allowing the exhaust gas emitted from the automobile and the like to flow. Furthermore, for example, when a temperature of the exhaust gas is low such as at engine startup, it is possible to promptly raise the temperature of the exhaust gas by allowing the exhaust gas to flow into the substrate while generating the heat of the heat storage material. Furthermore, as mentioned above, it is possible to increase the contact area between the heat storage material and reaction medium.

The porosity of the skeleton included in the three-dimensional network structure can be measured based on JIS R 1655 (Test method which can determine the pore size distribution of molded fine ceramics using the mercury penetration method). A minimum value of the porosity of the skeleton should not be specifically restricted as long as it is 1% or less. For example, the skeleton included in the three-dimensional network structure may be a dense skeleton substantially including no pore. By setting the porosity of the skeleton to 1% or less, the strength and thermal conductivity of the skeleton can be further improved.

Furthermore, in the heat storage member of the present embodiment, the void ratio of the three-dimensional network structure of the substrate is ranging from 30 to 95%. Herein, the void ratio of the three-dimensional network structure of the substrate can be measured by the following manners. First, chemical components of the substrate are analyzed and theoretical density of the substrate (apparent specific gravity) is measured. For example, in a case where the substrate includes carbon and silicon carbide, the chemical components of the substrate can be measured based on JIS R 2011 (Methods for chemical analysis of refractories containing carbon and silicon-carbide). Next, a size and mass of the substrate are measured so as to calculate bulk density of the substrate. By using these values, the void ratio of the substrate can be calculated by the following Formula: [void ratio={(theoretical density−bulk density)/theoretical density}×100]. Herein, the "void ratio of the three-dimensional network structure of the substrate" may simply be referred to as the "void ratio of the substrate". When the void ratio of the substrate is less than 30%, it is not preferable in that air permeability deteriorates and the contact area between the heat storage material and reaction medium decreases, which deteriorates the responsiveness of the heat generation and heat absorption of the heat storage material. On the other hand, when the void ratio of the substrate exceeds 95%, it is not preferable in that the strength of the substrate deteriorates considerably.

The void ratio of the substrate is preferably ranging from 35 to 95%, more preferably 40 to 90%, and still more preferably 50 to 85%.

The shape of the substrate is not specifically restricted. For example, the substrate may have a pillar shape including a first end face and second end face. A cross sectional shape of the substrate perpendicular to the direction from the first end face to the second end face may be, for example, a polygonal shape such as square shape, circular shape, elliptical shape, oval shape, or any other intermediate shape. Alternatively, the substrate may have a plate shape or spherical shape.

In the heat storage member of the present embodiment, a content ratio of SiC and a content ratio of Si in the skeleton included in the substrate are preferably adjusted as follows. Hereinafter, unless otherwise restricted, the "content ratio of SiC" and "content ratio of Si" mean a "content ratio of SiC in the skeleton" and a "content ratio of Si in the skeleton" respectively. The content ratio of SiC is preferably ranging from 40 to 99.7% by mass, excluding impure ingredients inevitably contained in a raw material. For example, SiC in the skeleton included in the substrate in the present invention may inevitably contain the impure ingredients by 0.3% or less. In a case where the content ratio of SiC is less than 40% by mass, the thermal conductivity of the substrate deteriorates so that the heat generated by the heat storage material may not be sufficiently transferred to the substrate and the heat from the substrate may not be sufficiently transferred to the heat storage material in the endothermic reaction. Accordingly, there is a possibility that the reactivity of the exothermic reaction and endothermic reaction of the heat storage material may deteriorate.

It is further preferable to adjust each ingredient amount so that the content ratio of SiC in the skeleton included in the substrate becomes 50 to 99.7% by mass. Such a structure enables the thermal conductivity of the substrate to be improved and efficiency in storing and radiating the heat of the heat storage member to be improved. Such a structure enables thermal shock resistance and thermal resistance of the substrate to be improved, which leads to achievement of a long-lived substrate. In a case where the content ratio of SiC in the skeleton is less than 50% by mass, the thermal conductivity of the substrate deteriorates so that the heat generated by the heat storage material may not be sufficiently transferred to the substrate and the heat from the substrate may not be sufficiently transferred to the heat storage material in the endothermic reaction. Accordingly, there is a possibility that the reactivity of the exothermic reaction and endothermic reaction of the heat storage material may deteriorate.

The content ratio of SiC and content ratio of Si in the skeleton included in the substrate can be measured based on JIS R 2011 (Methods for chemical analysis of refractories containing carbon and/or silicon-carbide).

Herein, after the heat storage material is eliminated in advance, it is possible to measure the content ratio of SiC and content ratio of Si in the "heat storage member" onto which the heat storage material has already been loaded.

The substrate containing the Si—SiC sintered body is preferably configured so that the content ratio of SiC and content ratio of metal Si in the skeleton are set within the range of the following numerical values. It is preferable that the content ratio of SiC in the skeleton is ranging from 45 to 99.7% by mass or the content ratio of metal Si is ranging from 5 to 60% by mass, or more preferably 5 to 55% by mass. Herein, SiC has a relatively high modulus of elasticity (for example, the modulus of elasticity is about 400 GPa), while metal Si has a relatively low modulus of elasticity (for example, the modulus of elasticity is about 100 GPa). Therefore, by setting the content ratio of SiC and content ratio of metal Si in the skeleton within the range of the aforementioned numerical values, it is possible to reduce a modulus of elasticity of the Si—SiC sintered body. It is more preferable that the content ratio of SiC in the skeleton is ranging from 50 to 99.7% by mass or the content ratio of metal Si is ranging from 5 to 50% by mass. Reduction in the modulus of elasticity of the Si—SiC sintered body leads to improvement in the thermal shock resistance. Herein, the thermal shock resistance can be evaluated by a coefficient of resistance to thermal shock fracture R' shown in the following Formula (1).

Coefficient of resistance to thermal shock fracture
$$R'=\sigma(1-\nu)\lambda/(\alpha E)$$  Formula (1):

(In the Formula (1), σ represents strength (bending strength), ν represents a Poisson's ratio, λ represents thermal conductivity, α represents a thermal expansion coefficient, and E represents a modulus of elasticity.)

The bending strength in the Formula (1) can be measured based on JIS R 1601 (Testing method for flexural strength (modulus of rupture) of fine ceramics at room temperature) or JIS R 1664 (Testing method for bending strength of porous fine ceramics).

The thermal conductivity of the skeleton included in the substrate at ambient temperatures is preferably 30 to 250 (W/m·K), more preferably 40 to 250 (W/m·K), and still more preferably 50 to 250 (W/m·K). Such a structure enables the heat between the substrate and the heat storage material to be more preferably exchanged, and the exothermic reaction and the endothermic reaction of the heat storage material to be preferably advanced. In a case where the thermal conductivity of the substrate is less than the aforementioned range of the numerical values, the heat generated by the heat storage material may not be sufficiently transferred to the substrate and the heat from the substrate may not be sufficiently transferred to the heat storage material in the endothermic reaction. Accordingly, there is a possibility that the reactivity of the exothermic reaction and endothermic reaction of the heat storage material may deteriorate.

Figure 4:
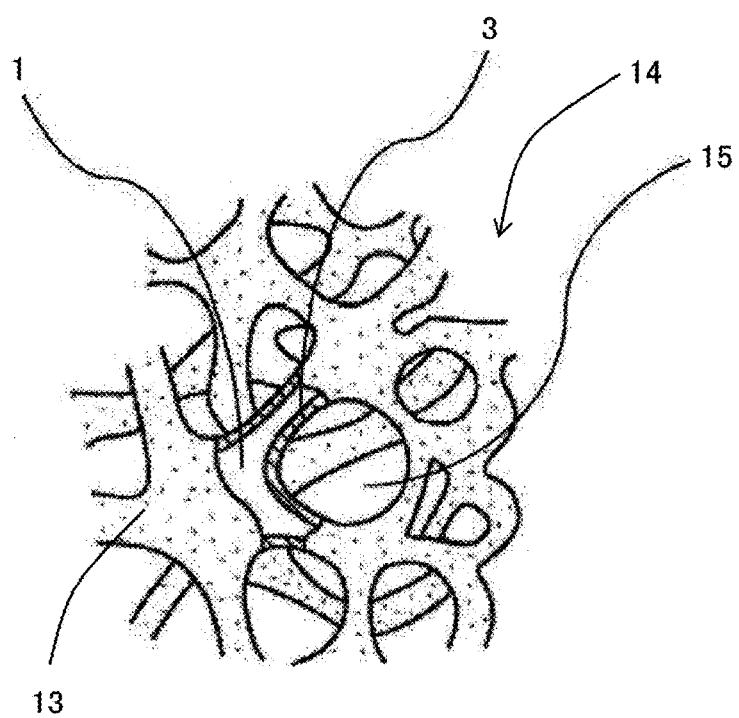
FIG. 4 is an enlarged schematic view schematically showing a state where a part of a skeleton shown in FIG. 3 is cut off.
Figure 5:
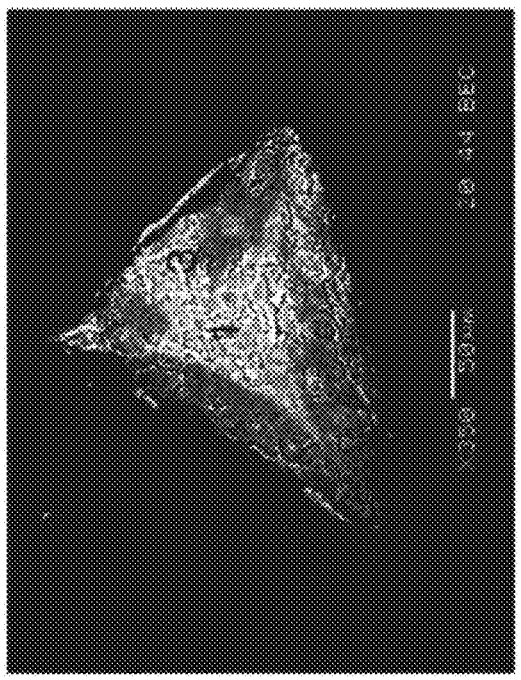
FIGS. 5A and 5B are photographs shot by a scanning electron microscope, showing cross sections of a skeleton included in a substrate used in the heat storage member according to an embodiment of the present invention.
Figure 5:
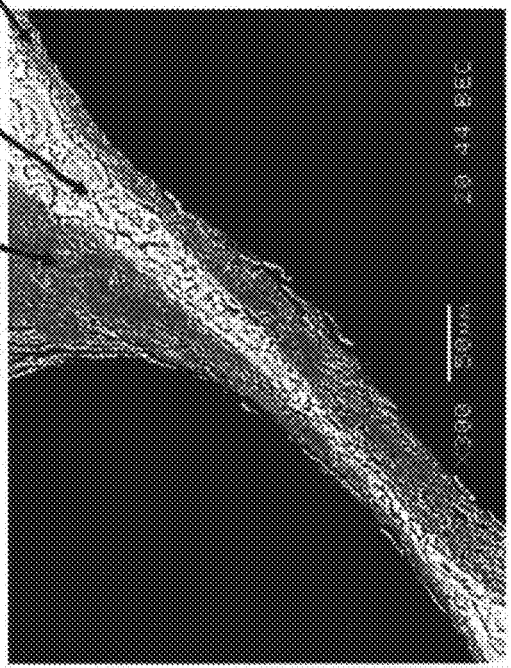

It is preferred that a Si—SiC skeleton included in the substrate includes a core part 1 and a surface layer part 3 facing the void 15 as shown in FIG. 4 and FIG. 5. FIG. 4 is an enlarged schematic view schematically showing a state where a part of the skeleton shown in FIG. 3 is cut off. FIGS. 5A and 5B are photographs shot by a scanning electron microscope, showing cross sections of the skeleton included in the substrate used in the heat storage member according to an embodiment of the present invention. FIG. 5A is a photograph of a cross section obtained by cutting the skeleton along a longitudinal direction (a direction toward which the skeleton is extended), and the FIG. 5B is a photograph of a cross section obtained by cutting the skeleton in a direction perpendicular to the longitudinal direction (the direction toward which the skeleton is extended).

The Si—SiC skeleton included in the substrate may be different in a ratio of constituent elements between the core part 1 and the surface layer part 3. The core part 1 includes metal Si as a principal ingredient and the remaining ingredients may contain an element C (carbon). The surface layer part 3 includes SiC as a principal ingredient and the remaining ingredients may contain metal Si. The ratio of the constituent elements of the skeleton included in the substrate can be measured by an energy dispersive X-ray spectrometry (EDS).

Furthermore, in the heat storage member of the present embodiment, density of the skeleton included in the three-dimensional network structure may be different between a first cross section including the direction from the first end face to the second end face and a second cross section including a direction perpendicular to the direction from the first end face to the second end face. In a case where the first cross section and the second cross section have different density of the skeleton, the density of the skeleton in the second cross section is preferably 1 to 10 times as large as the density of the skeleton in the first cross section. Such a structure enables the strength of the substrate to be enhanced. In a case where the density of the skeleton in the second cross section is 11 times as large as the density of the skeleton in the first cross section, there is a possibility that sufficient air permeability may not be obtained in the first cross section.

Herein, each density of the skeleton (hereinafter called "skeleton density") can be measured by the following method. First, the substrate is buried in epoxy resin and the substrate is cut at the first cross section and the second cross section. Each cross section of the cut substrate is polished so as to produce a sample for density measurement. Next, in the first cross section and the second cross section of the sample for density measurement, compositional images within a visual field of 0.1 cm² are obtained by using the scanning electron microscope. An applicable example of the scanning electron microscope includes a scanning electron microscope (model number: JSM-5600) manufactured by JEOL Ltd. According to the compositional images obtained by using brightness difference per element, the skeleton of the substrate and a void part can be shown clearly. Next, the obtained compositional images are binarized into black and white by using an image processing software under a constant brightness condition so as to measure total pixels of the skeleton and of the void part in each compositional image. As the image processing software, a free software such as ImageNos (Ver1.04) can be used. In such manners, a percentage of the total pixels of the skeleton with respect to the total pixels per a visual field of 0.1 cm² can be determined as the skeleton density. In other words, the skeleton density can be obtained by the following Formula (2). Based on the skeleton density in the first cross section and the skeleton density in the second cross section, a ratio of skeleton density in the first cross section and in the second cross section can be calculated by the following Formula (3). However, the skeleton is randomly arranged in the three-dimensional network structure so that it is difficult to calculate the skeleton density based on the cross sectional compositional images obtained from one visual field. Therefore, an average value measured based on five visual fields in each of the first cross section and the second cross section can be determined as the skeleton density.

Skeleton density=Total pixels of skeleton/Total pixels of skeleton and void part    Formula (2):

Ratio of skeleton density=Skeleton density in first cross section/Skeleton density in second cross section    Formula (3):

The skeleton included in the three-dimensional network structure may include protrusions in the surface of the skeleton. The protrusions in the surface of the skeleton mean that the surface of the skeleton has asperities having an average height of 0.5 to 100 µm. With regard to a method for forming the protrusions in the surface of the skeleton, for example, particulates each having an average particle diameter of 0.5 to 100 µm may be adhered to the surface of the skeleton and may be sintered so as to form the protrusions. Applicable examples of the particulates include SiC powder, Si powder, Si—SiC powder, and C powder. On the surface of the skeleton, it is preferable that the protrusions formed by the particulates are formed at a density of 1 to 1000000 protrusions/10000 µm². The density of the protrusions is more preferably 10 to 100000 protrusions/10000 µm², and still more preferably 100 to 10000 protrusions/10000 µm². The height and density of the protrusions on the surface of the skeleton can be measured by the following method. By observing the substrate with an optical microscope or an electronic microscope, an average value measured based on five visual fields can be determined as the height and the density of the protrusions on the surface of the skeleton. By forming the protrusions on the surface of the skeleton, a surface area of the substrate increases and the physical contact area between the substrate and the heat storage material also increases. Therefore, it is possible to exchange the heat between the substrate and the heat storage material more preferably and to advance the exothermic reaction and the endothermic reaction of the heat storage material preferably.

The substrate used in the heat storage member of the present embodiment may include, on the surface layer of the skeleton, a surface layer containing an ingredient different from that of the substrate. By including such a surface layer, it is possible to improve adhesion between the substrate and a heat storage material through the surface layer by chemically fusing the surface layer and heat storage material.

The surface layer including the ingredient different from that of the substrate may be a $SiO_2$ layer formed on the surface layer of the skeleton by carrying out heat treatment under the atmosphere on the substrate formed by the skeleton including the SiC sintered body and/or metal Si.

(1-2) Heat Storage Material:

The heat storage material applied in the heat storage member of the present embodiment may be a so-called chemical heat storage material configured to store and radiate the heat by the reversible chemical reaction with the reaction medium. Furthermore, it may be zeolite which stores and radiates the heat by physical adsorption to a reaction medium and by physical desorption from a reaction medium. There is no specific restriction on a material of the heat storage material as long as it is configured to store and radiate the heat by the reversible chemical reaction or physical adsorption and physical desorption. An example of the heat storage material can include a material including at least one selected from the group consisting of oxides of Mg, Ca, Sr, Ba, hydroxides of Mg, Ca, Sr, Ba, carbonates of Mg, Ca, Sr, Ba, chlorides of Mg, Ca, Sr, Ba, sulfates of Mg, Ca, Sr, Ba, and zeolite.

In the heat storage member of the present embodiment, the powdery (particulate) heat storage material is preferably adhered to at least a part of the surface of the void in the three-dimensional network structure of the substrate. With regard to the powdery heat storage material, the average particle diameter of the heat storage material is preferably 5 μm to 100 μm, more preferably 5 nm to 50 μm, and still more preferably 5 nm to 10 μm. In a case where the average particle diameter of the heat storage material is less than 5 nm, it is not preferable in that a heat storage property deteriorates due to aggregation of the heat storage material. In a case where the average particle diameter of the heat storage material is more than 100 μm, it is not preferable in that reactivity in a central part of a particle of the heat storage material deteriorates. The average particle diameter of the heat storage material can be measured as follows. By observing the substrate with the optical microscope or the electronic microscope, an average value measured based on five visual fields can be determined as the average particle diameter of the heat storage material.

An amount of the heat storage material to be disposed in (to be loaded onto) the heat storage member should not be specifically restricted, but it can be set appropriately in accordance with uses of the heat storage member.

The heat storage material is preferably powder. The heat storage material preferably has the average particle diameter of 5 nm to 100 μm. The more the heat storage material includes primary particles and secondary particles directly in contact with the substrate, the more it is preferable. According to such a form, it is preferable in that the heat radiated from the heat storage material can be easily transferred to the substrate. On the other hand, supposed that the surface layer of the particle of the heat storage material in contact with the substrate is laminated with another particle of the heat storage material not in contact with the substrate. In such a form, it is not preferable in that the heat radiated from the heat storage material is hardly transferred to the substrate. The form of the heat storage material can be measured as follows. By observing the heat storage member with the optical microscope or the electronic microscope, the form of the heat storage material can be checked from observation images.

(2) A Method for Producing the Heat Storage Member:

Hereinafter, a method for producing the heat storage member according to an embodiment of the present invention will be described.

(2-1) Production of the Substrate:

First, a commonly-applied method for forming powder such as a slip casting method, a gel casting method, an extrusion method, or a pressing method can be applied to produce the substrate containing the SiC sintered body as the principal ingredient used in the heat storage member. A known method such as a replica method and a direct forming method can be applied to produce the porous substrate having the void or the substrate having the three-dimensional network structure. The Si—SiC substrate can be produced by combining the gel casting method and the replica method as follows.

Figure 6:
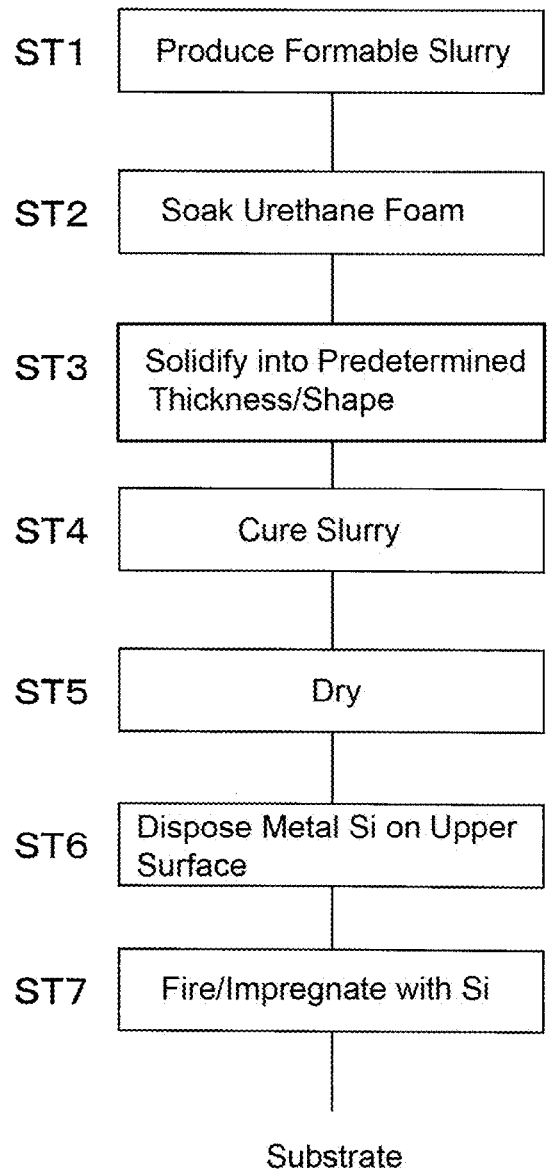
FIG. 6 is a flowchart for describing a producing process of the substrate used in the heat storage member according to an embodiment of the present invention.

The Si—SiC substrate can be produced by the gel casting method by following steps (ST1) to (ST7) shown in FIG. 6. The gel casting method is one of methods for forming a pulverulent body. For example, in the gel casting method, one or more types of pulverulent bodies selected from the group consisting of ceramic, glass, and metal are dispersed in a dispersing medium by using a dispersing agent so as to produce a slurry including the powder. Next, a material having gelation ability (a gellant) is added to the obtained slurry and the slurry is cured so as to obtain a formed body of any shape. FIG. 6 is a flowchart for describing a producing process of the substrate used in the heat storage member according to an embodiment of the present invention. Hereinafter, the steps (ST1) to (ST7) shown in FIG. 6 will be described in more detail.

(2-1a) ST1:

The substrate used in the heat storage member can be produced by the gel casting method so that, first, a formable slurry (SiC slurry) is produced. The formable slurry can be produced by dispersing SiC powder in an organic solvent to make it into slurry and then by adding a gellant to the obtained slurry. The formable slurry can also be produced by adding the SiC powder and the gellant to the organic solvent simultaneously and by dispersing the resultant.

Other than the SiC powder, pulverulent bodies of carbon, boron carbide, and the like may be appropriately mixed to be used. It should be noted that each particle diameter of various pulverulent bodies should not be specifically restricted, and it can be appropriately selected as long as the formable slurry can be produced.

Examples of the organic solvent used as the dispersing medium include polyhydric alcohols, polybasic acids and esters. Examples of the polyhydric alcohols include diols such as ethylene glycol and triols such as glycerin. Examples of the polybasic acids include dicarboxylic acid. Examples of the esters include polybasic acid esters, esters of polyhydric alcohols. It should be noted that examples of the polybasic acid esters include dimethylglutaric acid, dimethylmalonic acid. Examples of esters of polyhydric alcohols include triacetin.

The gellant is preferably an organic compound including a reactive functional group and capable of curing formable slurry. Examples of such an organic compound include three-dimensionally cross-linked prepolymers with a cross-linking agent involved such as urethane resin, acrylic resin, epoxy resin, and phenol resin. Taking into consideration the reactivity with the organic compound in the dispersing medium, it is preferable to select an organic compound including a preferable reactive functional group as the gellant. For example, in a case of using esters having relatively low reactivity as the organic solvent, it is preferable to select an organic compound including an isocyanate group (—N=C=O) and/or isothiocyanate group (—N=C=S) having high reactivity as the organic compound including the reactive functional group included in the gellant.

Taking workability into consideration, it is preferable that the formable slurry has viscosity of slurry of 50 dPa·s or less at 20° C. It is more preferable that the formable slurry has viscosity of slurry of 20 dPa·s or less at 20° C. The viscosity of slurry is a value measured by a commercially-available B type viscometer (Viscotester VT-04F (trade name) manufactured by RION Co., Ltd.).

Figure 7:
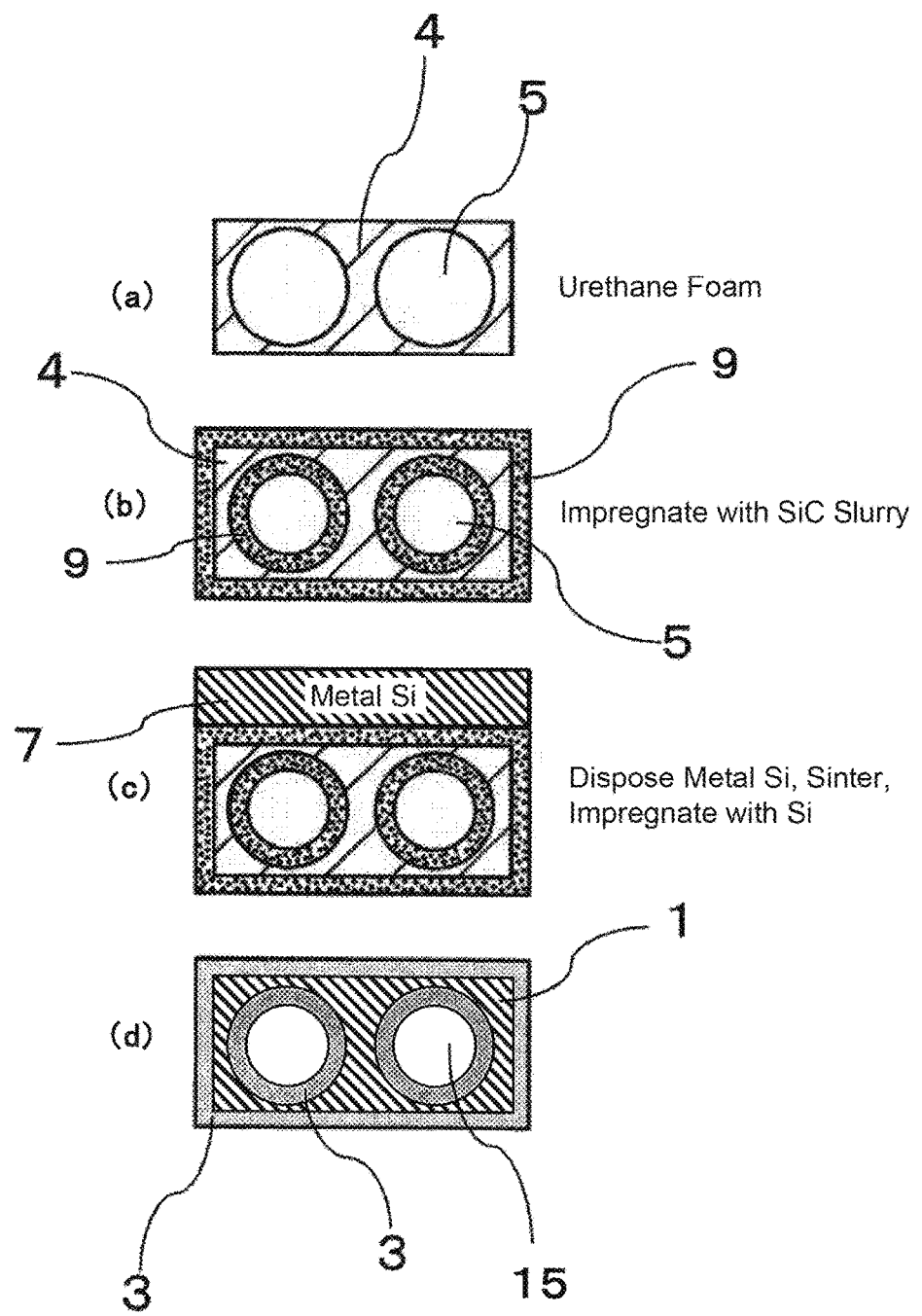
FIGS. 7A to 7D are schematic views for describing the producing process of the substrate used in the heat storage member according to an embodiment of the present invention.

In such manners, in producing the formable slurry (ST1), first, the ceramic pulverulent bodies, dispersing medium, and dispersing agent are compounded and mixed together. Then, the gellant as well as a catalyst and the like are added to the mixture to carry out a final preparation. The obtained formable slurry is preferably defoamed before impregnating urethane foam having the three-dimensional network structure with the formable slurry. In FIGS. 7A to 7D, a method for producing the Si—SiC substrate having the three-dimensional network structure will be described with reference to two-dimensional schematic views. FIG. 7A is a view schematically showing a two-dimensional cross section of the urethane foam having the three-dimensional network structure.

Mixture of the formable slurry is carried out in a pot mill, a ball mill, or the like. It is preferred that mixture is carried out by using a nylon cobble stone at a temperature of 15° C. to 35° C. for 12 hours or more, more preferably for 72 hours or more. Furthermore, the defoaming of the slurry is preferably carried out by stirring the slurry under a vacuum atmosphere having a degree of vacuum of −0.090 MPa or less. The degree of vacuum at the time of defoaming is preferably −0.095 MPa or less. Stirring speed is preferably 100 rpm to 500 rpm. Stirring time is preferably 5 minutes to 30 minutes.

(2-1b) (ST2) to (ST4):

The formable slurry produced in (ST1) is impregnated with the urethane foam having the three-dimensional network structure. After that, the resultant is squeezed to such an extent that the formable slurry may not close pores of the urethane foam, and surplus slurry is eliminated. Then, the formable slurry is disposed on a solidifying device and is left to stand at an ambient temperature to 200° C. for couple of hours to tens of hours. Accordingly, the formable slurry turns into gel and is cured into the formed body.

As shown in FIG. 7A, the urethane foam having the three-dimensional network structure includes a skeleton part 4 and a void part 5. In (ST2), as shown in FIG. 7B, a SiC slurry formed body 9 is formed facing the void part 5. Herein, the SiC slurry formed body 9 represents the formed body including the formable slurry obtained in (ST1). In FIGS. 7A to 7D, a reference numeral 7 denotes the metal Si. A reference numeral 1 denotes the core part of the skeleton which is impregnated with the metal Si. A reference numeral 3 denotes the surface layer part of the skeleton. A reference numeral 15 denotes the void in the three-dimensional network structure.

(2-1c) (ST5):

Next, the SiC slurry formed body 9 is dried at a temperature of 40° C. to 100° C. for 3 to 12 hours and is further dried at a temperature of 100° C. to 200° C. for 3 to 12 hours.

(2-1d) (ST6) to (ST7):

As shown in FIG. 7C, the metal Si 7 is disposed on the upper surface of the dried SiC slurry formed body 9 and is heated under an inert gas atmosphere at a temperature of 1400° C. to 1500° C. for 1 to 3 hours. The skeleton part 4 of the urethane foam is destroyed by fire at a temperature of 500° C. or so. As shown in FIG. 7D, a space formed by the destruction of the skeleton part 4 is impregnated with the metal Si 7 so as to obtain the substrate including the intricate Si—SiC skeleton having the three-dimensional network structure. According to this method, it is possible to impregnate the skeleton including the SiC slurry formed body 9 with the metal Si 7 so that a uniform impregnation can be achieved without clogging the void part 5 with the metal Si 7. The void ratio of the substrate produced in such a method is ranging, for example, from 30 to 95%. Herein, FIG. 7A to 7D are schematic views showing the producing process of the substrate used in the heat storage member according to an embodiment of the present invention.

It should be noted that a surface layer treatment step (ST8) may be provided subsequent to the aforementioned (ST7) as needed so as to form the surface layer containing the ingredient different from that of the substrate on the surface layer of the skeleton included in the substrate. There is no specific restriction on the method for forming the surface layer including the ingredient different from that of the substrate. For example, the $SiO_2$ layer can be formed on the surface layer of the skeleton by subjecting the substrate formed by the skeleton including the SiC sintered body and/or metal Si to a heat treatment in the atmosphere.

Furthermore, a dense layer including SiC or Si—SiC having the void ratio of 0.1 to 2% may be formed at least on a part of a periphery of the substrate as needed. For example, in a case of applying a pillar-shaped substrate, the dense layer can be formed on a side surface of the pillar-shaped substrate. In a case of applying a plate-shaped substrate, the dense layer can be formed at an edge portion of the substrate. The dense layer can be produced, for example, by the following method. First, the periphery of the produced substrate is coated or impregnated with the formable slurry produced in ST1 so as to close the void part of the substrate. After that, the formable slurry covering the void part of the substrate is cured, thereby carrying out a drying step to a Si impregnating step in ST5 to ST7.

(2-2) Production of the Heat Storage Material:

Hereinafter, the heat storage material used in the heat storage member is produced. A method for producing the heat storage material should not be specifically restricted and the heat storage material can be obtained by a known method. Commercially-available powder can be used as long as it is a Ca-type material such as calcium carbonate powder and calcium hydroxide powder. Furthermore, commercially-available powder can be used as long as it is a Mg-type material such as magnesium chloride powder and magnesium carbonate powder. Commercially-available zeolite powder can be also used. The powder is appropriately pulverized by using a pot mill and a sieve to have a predetermined average particle diameter, and then the powder is classified to be used. The average particle diameter of the powder can be measured by an optical microscope or an electronic microscope.

(2-3) Method for Disposing (Loading) of the Heat Storage Material to the Substrate:

Next, powder of the obtained heat storage material is dispersed in water or an organic solvent so as to produce a heat storage material slurry. The substrate having the three-dimensional network structure is dipped (soaked) into the produced heat storage material slurry. In such manners, the heat storage material is disposed in the inner surface of the void in the three-dimensional network structure of the substrate. A method for disposing the heat storage material should not be specifically restricted. The method for disposing the heat storage material can include any optimal methods such as a spray coating method can be employed. Next, after drying the substrate in which the heat storage material is disposed, the substrate is fired at a predetermined temperature (400 to 1000° C.), and the heat storage material and substrate are sintered so as to be disposed solidly.

In such manners, the heat storage member of the present embodiment can be produced. It should be noted that the method for producing the heat storage member should not be restricted to the method mentioned above. Hereinafter, modifications of the method for producing the heat storage member will be described.

(2-4) A Method for Producing the Heat Storage Member (Modification 1):

As shown in FIG. 6, in a step of "solidifying into a predetermined thickness and shape" in ST3, the urethane foam can be solidified by compression.

In such manners, by compressing the urethane foam before curing the formable slurry (ST4), it is possible to enhance the skeleton density of the "substrate having the three-dimensional network structure" and to obtain high strength. According to such a modification 1, it is possible to make the thickness of the substrate thin.

In the step of "solidifying into a predetermined thickness and shape" in ST3 in FIG. 6, it should be noted that the urethane foam can be solidified by forming the urethane foam with using a mold having a predetermined shape. In such manners, by solidifying the urethane foam into the predetermined shape before curing the formable slurry (ST4), it is possible to enhance a degree of freedom for the shape of the "substrate having the three-dimensional network structure" and to produce a substrate having an intricate shape.

(2-5) A Method for Producing the Heat Storage Member (Modification 2):

Prior to curing of the formable slurry (ST4), layers having different void ratios of the urethane foam and/or compressibility can be laminated and combined.

The substrate used in the heat storage member may have a laminated structure in which layers having different skeleton density are laminated. For example, in a case where the substrate with the laminated structure has a two-layer structure, the substrate can be made to have an optimum laminated structure in accordance with usage patterns. For example, a first layer may be a dense layer having high strength and a second layer may be a layer having high air permeability. In such a case, the first layer is the dense layer but the second layer has the three-dimensional network structure so that it is possible to obtain high air permeability in an upper surface and side surface of the second layer.

(3) Use of the Heat Storage Member:

In the heat storage member of the present embodiment, when an environmental temperature becomes equal to or higher than a heat-storage operative temperature, the endothermic reaction (for example, dehydration reaction) of the heat storage material occurs and a composition of the heat storage material changes. This endothermic reaction causes a heat-storage state of the heat storage material where the heat is recovered and stored. After that, the heat storage material in the heat-storage state is brought into contact with the reaction medium (for example, water vapor), which causes the exothermic reaction (hydration reaction) of the heat storage material in the heat-storage state and causes radiation of the heat. Unless the heat storage material in the heat-storage state is brought into contact with the reaction medium, even when the environmental temperature becomes lower than the heat-storage operative temperature, the heat storage material maintains its original form (that is, the heat-storage state). Therefore, there is no need to provide a heat insulating structure which is necessary in a latent heat storage body.

For example, the heat storage member of the present embodiment can be utilized for recovering and storing the exhaust heat of the automobile and the like and for using the recovered and stored heat for activation of a catalyst (catalyst for disposing exhaust gas) at the engine startup. Furthermore, the heat storage member herein can be utilized for a heater inside a cabin (indoor) of the automobile. For example, the heat storage member using calcium hydroxide $(Ca(OH)_2)$ as the heat storage material can be utilized by being disposed upstream of a place where the catalyst for disposing exhaust gas in an automotive exhaust system is disposed. It is preferred that a reaction medium generating device of a water vapor generating device is disposed upstream of the place where the heat storage member in the automotive exhaust system is disposed. When high-temperature exhaust gas emitted from the automobile flows into the heat storage member disposed in the automotive exhaust system, the calcium hydroxide which is the heat storage material triggers the endothermic reaction (dehydration reaction). In other words, a water molecule ($H_2O$) is desorbed from the heat storage material due to the endothermic reaction (dehydration reaction), and the heat storage material turns into calcium oxide (CaO). The heat storage material whose composition has changed to the calcium oxide is in the heat-storage state where the heat of the exhaust gas is recovered and stored. In startup of the engine, water vapor is generated from the reaction medium generating device and the generated water vapor ($H_2O$) is reacted with the calcium oxide (CaO) which is the heat storage material. This reaction is the exothermic reaction (hydration reaction), and the heat storage material radiates the heat.

EXAMPLES

The present invention will hereinafter be described in more detail based on Examples. It should be noted that the present invention should not be restricted to the following Examples.

Example 1

First, SiC powder was dispersed in an ester so as to produce a SiC slurry mixed with isocyanate. SiC had an average particle diameter of 0.5 µm. The average particle diameter of SiC was a median size measured by using a laser diffraction/scattering particle size analyzer (LA-950) manufactured by HORIBA, Ltd.

Next, prepared herein was a urethane foam having an axial thickness of 90 mm and including a first end face and a second end face each having a dimension of width 150 mm×length 150 mm. An applicable urethane foam herein was one with 50 cells (cells/25 mm) based on JIS K 6400-1 (Flexible foamed material-Determination of physical properties-). This urethane foam was soaked into the SiC slurry produced in advance and surplus SiC slurry was eliminated. Then, the urethane foam was compressed so that a skeleton density in a cross section having high skeleton density (cross section parallel to an axial direction) becomes nine times as large as a skeleton density in a cross section having low skeleton density (cross section perpendicular to the axial direction). After that, the SiC slurry was cured by gelling the isocyanate so as to obtain a formed body in which a SiC layer was formed on a surface of a skeleton of the urethane foam. Next, the obtained formed body was dried at a temperature of 100° C. so as to obtain a SiC formed body having a three-dimensional network structure.

Next, the obtained SiC formed body was disposed so that an end face in the axial direction faced upward in a vertical direction, and metal Si was disposed on an upper surface of the SiC formed body. With regard to an amount of the metal Si, a mass of the metal Si was set to 100 parts by mass when a mass of the SiC formed body was set to 100 parts by mass. Next, the SiC formed body on which the metal Si was mounted was fired under an argon atmosphere at a temperature of 1500° C. for 2 hours so as to produce a substrate including a Si—SiC sintered body having the three-dimensional network structure.

The obtained substrate was a plate having an axial thickness of 10 mm and including a first end face and a second end face each having a dimension of width 150 mm×length 150 mm. Furthermore, the obtained substrate was found to have the three-dimensional network structure including the skeleton derived from the urethane foam.

With regard to the obtained substrate, "porosity of the skeleton" and a "void ratio of the three-dimensional network structure" of the substrate were measured by the following method.

(Porosity of the Skeleton)

The porosity of the skeleton was measured based on JIS R 1655 (Test method which can determine the pore size distribution of molded fine ceramics using the mercury penetration method). A part of the obtained substrate was ruptured and a skeleton having a predetermined mass was collected as a specimen.

(Content Ratio of SiC and Content Ratio of Si in the Skeleton)

Chemical components of the obtained substrate were measured based on JIS R 2011 (Methods for chemical analysis of refractories containing carbon and/or silicon-carbide).

(Void Ratio of the Three-Dimensional Network Structure of the Substrate)

Based on the chemical components measured by the "content ratio of SiC and content ratio of Si in the skeleton", theoretical density (apparent specific gravity) of the substrate was calculated. Next, a size and mass of the substrate were measured so as to calculate bulk density of the substrate. By using these values, the void ratio of the substrate was calculated by the following Formula: [void ratio={(theoretical density−bulk density)/theoretical density}× 100].

Next, the heat storage material to be disposed in the obtained substrate was produced. With regard to the heat storage material, commercially-available calcium carbonate powder (manufactured by Wako Pure Chemical Industries, Ltd.) was used. The powder was pulverized to have an average particle diameter of 1 μm by using the pot mill and sieve, and then the powder was classified. The average particle diameter was a median size measured by using a laser diffraction/scattering particle size analyzer (LA-950) manufactured by HORIBA, Ltd.

Next, the produced heat storage material was dispersed in water so as to produce a slurry. By soaking the substrate having the three-dimensional network structure into the produced slurry, the heat storage material was disposed in an inner surface of a void in the three-dimensional network structure of the substrate. Next, the substrate in which the heat storage material was disposed was dried at a temperature of 100° C. for 12 hours, and the substrate was fired under the atmosphere at a temperature of 800° C. for 1 hour. Then, the heat storage material and substrate were sintered. In such manner, produced was the heat storage member of Example 1 in which the heat storage material was disposed in the inner surface of the void in the three-dimensional network structure of the substrate.

With respect to the obtained heat storage member, "strength" of the substrate, "rate of temperature rise", "thermal shock resistance", and "peeling resistance" of the heat storage material were evaluated by the following method. The results are shown in Table 1. Furthermore, a column of a "ratio of skeleton density" in Table 1 shows values of the ratio of skeleton density calculated by the aforementioned Formula (3).

TABLE 1

|  |  | Example 1 | Example 2 | Example 3 | Example 4 | Example 5 |
|---|---|---|---|---|---|---|
| Substrate | Material | Si—SiC | Si—SiC | Si—SiC | Si—SiC | Si—SiC |
|  | Porosity of skeleton (%) | 0.7 | 0.6 | 0.8 | 0.6 | 0.7 |
|  | Void ratio of three-dimensional network structure (%) | 32 | 46 | 53 | 61 | 72 |
|  | SiC content (% by mass) | 41.1 | 52.9 | 63.6 | 72.3 | 81.2 |
|  | Metal Si content (% by mass) | 58.7 | 46.9 | 36.2 | 27.5 | 18.6 |
|  | Shape of heat storage member | Square having a side length of 150 mm, Thickness 10 mm, Plate | | | | |
|  | Ratio of skeleton density | 9 | 6 | 5 | 4 | 3 |
| Heat storage material | Type of heat storage material | CaO | CaO | CaO | CaO | CaO |
|  | Particle size of heat storage material | 1 μm | 1 μm | 1 μm | 1 μm | 1 μm |
| Evaluation | Strength | A | A | A | A | A |
|  | Rate of temperature rise | B | B | B | B | B |
|  | Thermal shock resistance | B | B | B | B | B |
|  | Peeling resistance | B | B | B | B | B |

|  |  | Example 6 | Example 7 | Example 8 | Example 9 | Example 10 |
|---|---|---|---|---|---|---|
| Substrate | Material | Si—SiC | SiC | Si—SiC | Si—SiC | SiC |
|  | Porosity of skeleton (%) | 0.6 | 0.7 | 0.7 | 0.6 | 0.7 |
|  | Void ratio of three-dimensional network structure (%) | 84 | 94 | 32 | 61 | 94 |
|  | SiC content (% by mass) | 92.1 | 99.6 | 41.1 | 72.3 | 99.6 |
|  | Metal Si content (% by mass) | 7.7 | 0.0 | 58.7 | 27.5 | 0.0 |
|  | Shape of heat storage member | Square having a side length of 150 mm, Thickness 10 mm, Plate | | Diameter 100 mm, Axial length 100 mm Round pillar | | |
|  | Ratio of skeleton density | 2 | 1 | 9 | 4 | 1 |
| Heat storage material | Type of heat storage material | CaO | CaO | CaO | CaO | CaO |
|  | Particle size of heat storage material | 1 μm | 1 μm | 1 μm | 1 μm | 1 μm |

TABLE 1-continued

| Evaluation | Strength | A | B | A | A | B |
|---|---|---|---|---|---|---|
| | Rate of temperature rise | B | B | B | B | B |
| | Thermal shock resistance | B | B | B | B | B |
| | Peeling resistance | B | B | B | B | B |

(Strength)

Compressive strength of the substrate was obtained by the following method. First, a stainless-steel round pillar having a diameter of 10 mm was used as an indenter and the indenter was compressed into the substrate by press fitting. A load [N] at the time of this press fitting was measured and the measured load [N] was divided by an area [m$^2$] of a press-fitted surface of the indenter so as to calculate the compressive strength [Pa].

(Rate of Temperature Rise)

The rate of temperature rise was evaluated by using a commercially-available thermogravimetry for differential thermal analysis (TG-DTA). Measured herein was the time taken from a point when addition of a reaction medium (water vapor) to the heat storage member was started to a point when gas flowing out of the heat storage member reached a peak temperature.

(Evaluation on the Thermal Shock Resistance of the Substrate)

The thermal shock resistance of the substrate was evaluated by the following method. First, the substrate was rapidly heated at a temperature of 600° C./min by using a gas burner. Then, the substrate was left to stand in the atmosphere and allowed to be cooled naturally. After repeating the rapid heating by the gas burner and natural cooling, a state of the substrate to be evaluated was checked. In the evaluation on the thermal shock resistance of the substrate, the number of repetitions until the substrate was ruptured was measured.

(Evaluation on the Peeling Resistance of the Heat Storage Material)

The reaction medium (water vapor) was added to the heat storage member so as to raise the temperature of the heat storage member, and the resultant was cooled. Rising temperature and cooling down were repeatedly carried out. Then, the state of the heat storage material was checked. In the evaluation on the peeling resistance of the heat storage material, the number of repetitions until the heat storage material was peeled off was measured. Criterion for each evaluation is shown in Table 2. In the criterion of Table 2, the evaluation "A" represents the most excellent, and the evaluation "B" represents the second most excellent. The evaluation "C" is the worst.

Example 2

In producing a substrate, a heat storage member was produced in the following manners. Prepared herein was a urethane foam having an axial thickness of 60 mm and including a first end face and a second end face each having a dimension of width 150 mm×length 150 mm. The urethane foam was compressed so that skeleton density in a cross section having high skeleton density (cross section parallel to an axial direction) becomes six times as large as skeleton density in a cross section having low skeleton density (cross section perpendicular to the axial direction). Furthermore, with regard to an amount of metal Si, a mass of the metal Si was set to 65 parts by mass when a mass of a SiC formed body was set to 100 parts by mass. The heat storage member was produced in the same manner as in Example 1 except for the aforementioned facts. A void ratio of the substrate in Example 2 was 46%.

Example 3

In producing a substrate, a heat storage member was produced in the following manners. Prepared herein was a urethane foam having an axial thickness of 50 mm and including a first end face and a second end face each having a dimension of width 150 mm×length 150 mm. The urethane foam was compressed so that skeleton density in a cross section having high skeleton density (cross section parallel to an axial direction) becomes five times as large as skeleton density in a cross section having low skeleton density (cross section perpendicular to the axial direction). Furthermore, with regard to an amount of metal Si, a mass of the metal Si was set to 40 parts by mass when a mass of a SiC formed body was set to 100 parts by mass. The heat storage member was produced in the same manner as in Example 1 except for the aforementioned facts. A void ratio of the substrate in Example 3 was 53%.

Example 4

In producing a substrate, a heat storage member was produced in the following manners. Prepared herein was a urethane foam having an axial thickness of 40 mm and including a first end face and a second end face each having a dimension of width 150 mm×length 150 mm. The urethane

TABLE 2

| Criterion for evaluation | | A | B | C |
|---|---|---|---|---|
| Strength | Compressive strength | 1 MPa or more | 0.5 MPa or more | less than 0.5 MPa |
| Rate of temperature rise | Time taken till reaching a peak of temperature rise | under 20 seconds | under 30 seconds | 31 seconds or more |
| Thermal shock resistance | Number of repetitions until substrate was ruptured | ten times or more | twice or more | once |
| Peeling resistance | Number of repetitions until heat storage material was peeled off | ten times or more | twice or more | once | foam was compressed so that skeleton density in a cross section having high skeleton density (cross section parallel to an axial direction) becomes four times as large as skeleton density in a cross section having low skeleton density (cross section perpendicular to the axial direction). Furthermore, with regard to an amount of metal Si, a mass of the metal Si was set to 27 parts by mass when a mass of a SiC formed body was set to 100 parts by mass. The heat storage member was produced in the same manner as in Example 1 except for the aforementioned facts. A void ratio of the substrate in Example 4 was 61%.

Example 5

In producing a substrate, a heat storage member was produced in the following manners. Prepared herein was a urethane foam having an axial thickness of 30 mm and including a first end face and a second end face each having a dimension of width 150 mm×length 150 mm. The urethane foam was compressed so that skeleton density in a cross section having high skeleton density (cross section parallel to an axial direction) becomes three times as large as skeleton density in a cross section having low skeleton density (cross section perpendicular to the axial direction). Furthermore, with regard to an amount of metal Si, a mass of the metal Si was set to 16 parts by mass when a mass of a SiC formed body was set to 100 parts by mass. The heat storage member was produced in the same manner as in Example 1 except for the aforementioned facts. A void ratio of the substrate in Example 5 was 72%.

Example 6

In producing a substrate, a heat storage member was produced in the following manners. Prepared herein was a urethane foam having an axial thickness of 20 mm and including a first end face and a second end face each having a dimension of width 150 mm×length 150 mm. The urethane foam was compressed so that skeleton density in a cross section having high skeleton density (cross section parallel to an axial direction) becomes twice as large as skeleton density in a cross section having low skeleton density (cross section perpendicular to the axial direction). Furthermore, with regard to an amount of metal Si, a mass of the metal Si was set to 6 parts by mass when a mass of a SiC formed body was set to 100 parts by mass. The heat storage member was produced in the same manner as in Example 1 except for the aforementioned facts. A void ratio of the substrate in Example 6 was 84%.

Example 7

In producing a substrate, first, SiC powder was dispersed in an ester and a SiC slurry mixed with isocyanate was stirred by a mixer so as to introduce bubbles in the SiC slurry. Next, prepared herein was a plate-shaped mold having an axial thickness of 10 mm and including a first end face and a second end face each having a dimension of width 150 mm×length 150 mm. The SiC slurry with the bubbles introduced therein was poured into the mold. After that, the SiC slurry was cured by gelling the isocyanate so as to form SiC into a three-dimensional network shape. Next, the obtained SiC formed body was dried at a temperature of 100° C. so as to obtain a SiC formed body having a three-dimensional network structure. Next, the obtained SiC formed body was disposed so that an end face in an axial direction faced upward in a vertical direction. Then, the SiC formed body was fired under an argon atmosphere at a temperature of 2100° C. for 2 hours so as to produce a substrate including a SiC sintered body having the three-dimensional network structure. With regard to the substrate in Example 7, a content ratio of SiC of the skeleton was 99.6%, and a void ratio of the three-dimensional network structure was 94%.

Example 8

Next, prepared herein was urethane foam having an axial thickness of 900 mm and including a first end face and a second end face each having an outside diameter of 100 mm in diameter. An applicable urethane foam herein was one with 8 cells (cells/25 mm) based on JIS K 6400-1 (Flexible foamed material-Determination of physical properties-). This urethane foam was soaked into the SiC slurry produced in advance and surplus SiC slurry was eliminated. Then, the urethane foam was compressed so that skeleton density in a cross section having high skeleton density (cross section parallel to an axial direction) becomes nine times as large as skeleton density in a cross section having low skeleton density (cross section perpendicular to the axial direction). After that, the SiC slurry was cured by gelling the isocyanate so as to obtain a formed body in which a SiC layer was formed on a surface of a skeleton of the urethane foam. Next, the obtained formed body was dried at a temperature of 100° C. so as to obtain a SiC formed body having a three-dimensional network structure.

Next, the obtained SiC formed body was disposed so that an end face in the axial direction faced upward in a vertical direction, and metal Si was disposed on an upper surface of the SiC formed body. With regard to an amount of the metal Si, a mass of the metal Si was set to 100 parts by mass when a mass of the SiC formed body was set to 100 parts by mass. Next, the SiC formed body on which the metal Si was mounted was fired under an argon atmosphere at a temperature of 1500° C. for 2 hours so as to produce a substrate including a Si—SiC sintered body having the three-dimensional network structure.

The obtained substrate had a round pillar shape having an axial length of 100 mm and including a first end face and a second end face each having an outer diameter of 100 mm. Furthermore, the obtained substrate was found to have the three-dimensional network structure including the skeleton derived from the urethane foam. With regard to the substrate in Example 8, porosity of the skeleton was 32%.

Example 9

In producing a substrate, a heat storage member was produced in the following manners. Prepared herein was urethane foam having an axial thickness of 400 mm and including a first end face and a second end face each having an outside diameter of 100 mm in diameter. The urethane foam was compressed so that skeleton density in a cross section having high skeleton density (cross section parallel to an axial direction) becomes four times as large as skeleton density in a cross section having low skeleton density (cross section perpendicular to the axial direction). The heat storage member was produced in the same manner as in Example 8 except for the aforementioned facts. A void ratio of the substrate in Example 9 was 61%.

Example 10

In producing a substrate, a heat storage member was produced in the same manner as in Example 7 except that an outer diameter of a first end face and that of a second end face were set to 100 mm in diameter and that a round pillar-shaped mold having an axial thickness of 100 mm was prepared. A void ratio of the substrate in Example 10 was 94%.

Example 11

SiC powder having an average particle diameter of 10 μm was dispersed in an ester so as to produce a SiC slurry mixed with isocyanate. The substrate obtained in Example 8 was soaked into this SiC slurry and surplus SiC slurry was eliminated. After that, the SiC slurry was cured by gelling the isocyanate and SiC particulates were adhered to a surface of a skeleton of the substrate so as to obtain a substrate with protrusions formed thereon. Next, the obtained substrate was dried at a temperature of 100° C. and was disposed so that one of its end faces faced upward in a vertical direction. Then, the substrate was fired under an argon atmosphere at a temperature of 1500° C. for 2 hours. In such manner, the SiC particulates were adhered to the surface of the skeleton so as to produce the substrate including a Si—SiC sintered body having a three-dimensional network structure and including sintered protrusions. The surface of the skeleton of the substrate was formed with the protrusions formed by the SiC particulates at a density of 100 protrusions/10000 μm². Furthermore, the protrusions of the surface of the skeleton had an average height of 10 The results are shown in Table 3.

Example 12

The substrate obtained in Example 8 was fired under the atmosphere at a temperature of 800° C. for 2 hours, thereafter a surface treatment was carried out on a Si—SiC skeleton.

Example 13

The substrate obtained in Example 11 was fired under the atmosphere at a temperature of 800° C. for 2 hours so as to form a surface layer, on a surface layer of a skeleton, containing $SiO_2$ different from Si—SiC, an ingredient of the substrate.

Example 14

Metal Si powder having an average particle diameter of 10 μm was dispersed in an ester so as to produce a SiC slurry mixed with isocyanate. The substrate obtained in Example 9 was soaked into this SiC slurry and surplus SiC slurry was eliminated. After that, the SiC slurry was cured by gelling the isocyanate and SiC particulates were adhered to a surface of a skeleton of the substrate so as to obtain a substrate with protrusions formed thereon. Next, the obtained substrate was dried at a temperature of 100° C. and was disposed so that one of its end faces faced upward in a vertical direction. Then, the substrate was fired under an argon atmosphere at a temperature of 1500° C. for 2 hours. In such manner, the SiC particulates were adhered to the surface of the skeleton so as to produce the substrate including a Si—SiC sintered body having a three-dimensional network structure and including sintered protrusions. The surface of the skeleton of the substrate was formed with the protrusions formed by the SiC particulates at a density of 100 protrusions/10000 μm². Furthermore, the protrusions of the surface of the skeleton had an average height of 10 μm.

Example 15

The substrate obtained in Example 9 was fired under the atmosphere at a temperature of 800° C. for 2 hours, thereafter a surface treatment was carried out on a Si—SiC skeleton.

Example 16

The substrate obtained in Example 14 was fired under the atmosphere at a temperature of 800° C. for 2 hours so as to form a surface layer, on a surface layer of a skeleton, containing $SiO_2$ different from Si—SiC, an ingredient of the substrate.

Example 17

Si—SiC powder having an average particle diameter of 10 μm was dispersed in an ester so as to produce a SiC slurry mixed with isocyanate. The substrate obtained in Example 10 was soaked into this SiC slurry and surplus SiC slurry was eliminated. After that, the SiC slurry was cured by gelling the isocyanate and SiC particulates were adhered to a surface of a skeleton of the substrate so as to obtain a substrate with protrusions formed thereon. Next, the obtained substrate was dried at a temperature of 100° C. and was disposed so that one of its end faces faced upward in a vertical direction. Then, the substrate was fired under an argon atmosphere at a temperature of 1500° C. for 2 hours. In such manner, the SiC particulates were adhered to the surface of the skeleton so as to produce the substrate including a Si—SiC sintered body having a three-dimensional network structure and including sintered protrusions. The surface of the skeleton of the substrate was formed with the protrusions formed by the SiC particulates at a density of 100 protrusions/10000 μm². Furthermore, the protrusions of the surface of the skeleton had an average height of 10 μm.

Example 18

The substrate obtained in Example 10 was fired under the atmosphere at a temperature of 800° C. for 2 hours, thereafter a surface treatment was carried out on a Si—SiC skeleton.

Example 19

The substrate obtained Example 17 was fired under the atmosphere at a temperature of 800° C. for 2 hours so as to form a surface layer, on a surface layer of a skeleton, containing $SiO_2$ different from Si—SiC, an ingredient of the substrate.

Example 20

A heat storage member was produced in the same manner as in Example 9 except for the following facts. That is, commercially-available calcium carbonate powder (manufactured by Wako Pure Chemical Industries, Ltd.) was used as a heat storage material, and the powder was pulverized with a pot mill and sieve so as to have an average particle diameter of 7 nm, and then the powder was classified. The results are shown in Table 4.

Examples 21 to 23

A heat storage member was produced in the same manner as in Examples 9 or 20 except for the following facts. That is, commercially-available calcium carbonate powder (manufactured by Wako Pure Chemical Industries, Ltd.) was used as a heat storage material, and the powder was pulverized with a pot mill and sieve, appropriately changing an average particle diameter in each Example, and then the powder was classified.

Example 24

A heat storage member was produced in the same manner as in Example 10 except for the following facts. That is, commercially-available magnesium hydroxide powder (manufactured by Wako Pure Chemical Industries, Ltd.) was used as a heat storage material, and the powder was pulverized with a pot mill and sieve so as to have an average particle diameter of 1 μm, and then the powder was classified.

Examples 25 to 27

A heat storage member was produced in the same manner as in Example 24 except for the following facts. That is, a commercially-available reagent was appropriately modified and used as a heat storage material, and the powder was pulverized with a pot mill and sieve, appropriately changing an average particle diameter in each Example, and then the powder was classified.

Example 28

A heat storage member was produced in the same manner as in Example 24 except for the following facts. That is, commercially-available zeolite powder (manufactured by Tosoh Corporation) was used as a heat storage material, and the powder was pulverized with a pot mill and sieve so as to have an average particle diameter of 3 μm, and then the powder was classified.

Comparative Example 1

In producing a substrate, first, $Al_2O_3$ powder was dispersed in an ester so as to produce an $Al_2O_3$ slurry mixed with isocyanate. Next, prepared herein was a urethane foam having an axial thickness of 90 mm and including a first end face and a second end face each having a dimension of width 150 mm×length 150 mm. Urethane foam with 50 cells (cells/25 mm) was used herein. This urethane foam was soaked into the $Al_2O_3$ slurry produced in advance and surplus $Al_2O_3$ slurry was eliminated. Then, the urethane foam was compressed so that skeleton density in a cross section having high skeleton density (cross section parallel to an axial direction) becomes nine times as large as skeleton density in a cross section having low skeleton density (cross section perpendicular to the axial direction). After that, the $Al_2O_3$ slurry was cured by gelling the isocyanate so as to obtain a formed body in which an $Al_2O_3$ layer was formed on a surface of a skeleton of the urethane foam. Next, the obtained formed body was dried at a temperature of 100° C. so as to obtain an $Al_2O_3$ formed body having a three-dimensional network structure.

Next, the obtained $Al_2O_3$ formed body was disposed so that an end face in the axial direction faced upward in a vertical direction. Then, the $Al_2O_3$ formed body was fired under the atmosphere at a temperature of 1600° C. for 2 hours so as to produce a substrate including an $Al_2O_3$ sintered body having the three-dimensional network structure.

The obtained substrate was a plate having an axial thickness of 10 mm and including a first end face and a second end face each having a dimension of width 150 mm×length 150 mm. Furthermore, the obtained substrate was found to have the three-dimensional network structure including the skeleton derived from the urethane foam. A heat storage member was produced in the same manner as in Example 1 except that a method for producing the substrate was changed. The results are shown in Table 5.

Comparative Example 2

In producing a substrate, a heat storage member was produced in the following manners. Prepared herein was a urethane foam having an axial thickness of 150 mm and including a first end face and a second end face each having a dimension of width 150 mm×length 150 mm. The urethane foam was compressed so that skeleton density in a cross section having high skeleton density (cross section parallel to an axial direction) becomes 15 times as large as skeleton density in a cross section having low skeleton density (cross section perpendicular to the axial direction). The heat storage member was produced in the same manner as in Example 1 except for the aforementioned facts. A void ratio of the substrate in Comparative Example 2 was 25%.

Comparative Example 3

In Comparative Example 3, a heat storage member was produced in the same manner as in Example 1 except that a substrate was produced by setting an amount of metal Si disposed on an upper surface of a SiC formed body to 25 parts by mass when a mass of the SiC formed body was set to 100 parts by mass. With regard to the substrate in Comparative Example 3, porosity of a skeleton was 18%.

Comparative Example 4

In producing a substrate, first, $Al_2O_3$ powder was dispersed in an ester so as to produce an $Al_2O_3$ slurry mixed with isocyanate. Next, prepared herein was a urethane foam having an axial thickness of 40 mm and including a first end face and a second end face each having a dimension of width 150 mm×length 150 mm. Urethane foam with 50 cells (cells/25 mm) was used herein. This urethane foam was soaked into the $Al_2O_3$ slurry produced in advance and surplus $Al_2O_3$ slurry was eliminated. Then, the urethane foam was compressed so that skeleton density in a cross section having high skeleton density (cross section parallel to an axial direction) becomes four times as large as skeleton density in a cross section having low skeleton density (cross section perpendicular to the axial direction). After that, the $Al_2O_3$ slurry was cured by gelling the isocyanate so as to obtain a formed body in which an $Al_2O_3$ layer was formed on a surface of a skeleton of the urethane foam. Next, the obtained formed body was dried at a temperature of 100° C. so as to obtain an $Al_2O_3$ formed body having a three-dimensional network structure.

Next, the obtained $Al_2O_3$ formed body was disposed so that an end face in the axial direction faced upward in a vertical direction. Then, the $Al_2O_3$ formed body was fired under the atmosphere at a temperature of 1600° C. for 2 hours so as to produce a substrate including an Al$_2$O$_3$ sintered body having the three-dimensional network structure.

The obtained substrate was a plate having an axial thickness of 10 mm and including a first end face and a second end face each having a dimension of width 150 mm×length 150 mm. Furthermore, the obtained substrate was found to have the three-dimensional network structure including the skeleton derived from the urethane foam. A heat storage member was produced in the same manner as in Example 1 except that a method for producing the substrate was changed. A void ratio of the three-dimensional network structure of the substrate produced in Comparative Example 4 was 61%.

Comparative Example 5

Prepared herein was a urethane foam having an axial thickness of 10 mm and including a first end face and a second end face each having a dimension of width 150 mm×length 150 mm. A heat storage member was produced in the same manner as in Comparative Example 4 except that the urethane foam was formed so that skeleton density in a cross section having high skeleton density (cross section parallel to an axial direction) becomes as large as skeleton density in a cross section having low skeleton density (cross section perpendicular to the axial direction). A void ratio of a three-dimensional network structure of a substrate produced in Comparative Example 5 was 94%.

Comparative Example 6

In producing a substrate, a heat storage member was produced in the same manner as in Comparative Example 2 except that an amount of metal Si disposed on an upper surface of a SiC formed body was changed to 40 parts by mass when a mass of the SiC formed body was set to 100 parts by mass.

Comparative Example 7

In producing a substrate, a heat storage member was produced in the same manner as in Comparative Example 2 except that an amount of metal Si disposed on an upper surface of a SiC formed body was changed to 6 parts by mass when a mass of the SiC formed body was set to 100 parts by mass.

Comparative Example 8

In producing a substrate, first, mullite (3Al$_2$O$_3$.2SiO$_2$) powder was dispersed in an ester so as to produce a mullite slurry mixed with isocyanate. Next, prepared herein was a urethane foam having an axial thickness of 90 mm and including a first end face and a second end face each having a dimension of width 150 mm×length 150 mm. Urethane foam with 50 cells (cells/25 mm) was used herein. This urethane foam was soaked into the mullite slurry produced in advance and surplus mullite slurry was eliminated. Then, the urethane foam was compressed so that skeleton density in a cross section having high skeleton density (cross section parallel to an axial direction) becomes nine times as large as skeleton density in a cross section having low skeleton density (cross section perpendicular to the axial direction). After that, the mullite slurry was cured by gelling the isocyanate so as to obtain a formed body in which a mullite layer was formed on a surface of a skeleton of the urethane foam. Next, the obtained formed body was dried at a temperature of 100° C. so as to obtain a mullite formed body having a three-dimensional network structure. Next, the obtained mullite formed body was disposed so that an end face in the axial direction faced upward in a vertical direction. Then, the mullite formed body was fired under the atmosphere at a temperature of 1500° C. for 2 hours so as to produce a substrate including a mullite sintered body having the three-dimensional network structure. A heat storage member was produced in the same manner as in Example 1 except that a method for producing the substrate was changed.

Comparative Example 9

In producing a substrate, first, cordierite (2MgO.2Al$_2$O$_3$.5SiO$_2$) powder was dispersed in an ester so as to produce a cordierite slurry mixed with isocyanate. Next, prepared herein was a urethane foam having an axial thickness of 90 mm and including a first end face and a second end face each having a dimension of width 150 mm×length 150 mm. Urethane foam with 50 cells (cells/25 mm) was used herein. This urethane foam was soaked into the cordierite slurry produced in advance and surplus cordierite slurry was eliminated. Then, the urethane foam was compressed so that skeleton density in a cross section having high skeleton density (cross section parallel to an axial direction) becomes nine times as large as skeleton density in a cross section having low skeleton density (cross section perpendicular to the axial direction). After that, the cordierite slurry was cured by gelling the isocyanate so as to obtain a formed body in which a cordierite layer was formed on a surface of a skeleton of the urethane foam. Next, the obtained formed body was dried at a temperature of 100° C. so as to obtain a cordierite formed body having a three-dimensional network structure. Next, the obtained cordierite formed body was disposed so that an end face in the axial direction faced upward in a vertical direction. Then, the cordierite formed body was fired under the atmosphere at a temperature of 1350° C. for 2 hours so as to produce a substrate including a cordierite sintered body having the three-dimensional network structure. A heat storage member was produced in the same manner as in Example 1 except that a method for producing the substrate was changed.

Comparative Example 10

In Comparative Example 10, Ni alloy was used, which had a three-dimensional network structure in which a void ratio of the three-dimensional network structure was 61% when a substrate was produced. A heat storage member was produced in the same manner as in Example 1 except that a method for producing the substrate was changed.

With respect to Examples 2 to 28 and Comparative Examples 1 to 10, the "strength" of the substrate, "rate of temperature rise", "thermal shock resistance" and "peeling resistance" were evaluated by the aforementioned method. The results are shown in Table 1, and Table 3 to Table 5.

TABLE 3

|  |  | Example 11 | Example 12 | Example 13 | Example 14 | Example 15 |
|---|---|---|---|---|---|---|
| Substrate | Material | Si—SiC | Si—SiC | Si—SiC | Si—SiC | SiC |
|  | Porosity of skeleton (%) | 0.7 | 0.7 | 0.7 | 0.6 | 0.6 |
|  | Void ratio of three-dimensional network structure (%) | 32 | 32 | 32 | 61 | 61 |
|  | SiC content (% by mass) | 41.1 | 41.1 | 41.1 | 72.3 | 72.3 |
|  | Si content (% by mass) | 58.7 | 58.7 | 58.7 | 27.5 | 27.5 |
|  | Shape of heat storage member | | | Diameter 100 mm, Axial length 100 mm Round pillar | | |
|  | Ratio of skeleton density | 9 | 9 | 9 | 4 | 4 |
|  | Protrusion | Applicable, 10 μm | N/A | Applicable, 10 μm | Applicable, 10 μm | N/A |
|  | Surface treatment | N/A | Applicable | Applicable | N/A | Applicable |
| Heat storage material | Type of heat storage material | CaO | CaO | CaO | CaO | CaO |
|  | Particle size of heat storage material | 1 μm | 1 μm | 1 μm | 1 μm | 1 μm |
| Evaluation | Strength | A | A | A | A | A |
|  | Rate of temperature rise | A | B | A | A | B |
|  | Thermal shock resistance | B | B | B | B | B |
|  | Peeling resistance | B | A | A | B | A |

|  |  | Example 16 | Example 17 | Example 18 | Example 19 |
|---|---|---|---|---|---|
| Substrate | Material | Si—SiC | SiC | SiC | SiC |
|  | Porosity of skeleton (%) | 0.6 | 0.7 | 0.7 | 0.7 |
|  | Void ratio of three-dimensional network structure (%) | 61 | 94 | 94 | 94 |
|  | SiC content (% by mass) | 72.3 | 99.6 | 99.6 | 99.6 |
|  | Si content (% by mass) | 27.5 | 0.0 | 0.0 | 0.0 |
|  | Shape of heat storage member | | Diameter 100 mm, Axial length 100 mm Round pillar | | |
|  | Ratio of skeleton density | 4 | 1 | 1 | 1 |
|  | Protrusion | Applicable, 10 μm | Applicable, 10 μm | N/A | Applicable, 10 μm |
|  | Surface treatment | Applicable | N/A | Applicable | Applicable |
| Heat storage material | Type of heat storage material | CaO | CaO | CaO | CaO |
|  | Particle size of heat storage material | 1 μm | 1 μm | 1 μm | 1 μm |
| Evaluation | Strength | A | B | B | B |
|  | Rate of temperature rise | A | A | B | A |
|  | Thermal shock resistance | B | B | B | B |
|  | Peeling resistance | A | B | A | A |

TABLE 4

|  |  | Example 20 | Example 21 | Example 22 | Example 23 | Example 24 | Example 25 | Example 26 | Example 27 | Example 28 |
|---|---|---|---|---|---|---|---|---|---|---|
| Substrate | Material | Si—SiC | Si—SiC | Si—SiC | Si—SiC | SiC | SiC | SiC | SiC | SiC |
|  | Porosity of skeleton (%) | 0.6 | 0.6 | 0.6 | 0.6 | 0.7 | 0.7 | 0.7 | 0.7 | 0.7 |
|  | Void ratio of three-dimensional network structure (%) | 61 | 61 | 61 | 61 | 94 | 94 | 94 | 94 | 94 |
|  | SiC content (% by mass) | 72.3 | 72.3 | 72.3 | 72.3 | 99.6 | 99.6 | 99.6 | 99.6 | 99.6 |
|  | Si content (% by mass) | 27.5 | 27.5 | 27.5 | 27.5 | 0.0 | 0.0 | 0.0 | 0.0 | 0.0 |
|  | Shape of heat storage member | | | | | Diameter 100 mm, Axial length 100 mm Round pillar | | | | |
|  | Ratio of skeleton density | 4 | 4 | 4 | 4 | 1 | 1 | 1 | 1 | 1 |
| Heat storage material | Type of heat storage material | CaCO3 | CaCO3 | CaCO3 | CaCO3 | MgO | Mg(OH)2 | MgCl2 | BaSO4 | Zeolite |
|  | Particle size of heat storage material | 7 nm | 1 μm | 14 μm | 91 μm | 1 μm | 25 μm | 1 μm | 68 μm | 3 μm |
| Evaluation | Strength | A | A | A | A | B | B | B | B | B |
|  | Rate of temperature rise | A | A | B | B | A | B | A | B | A |
|  | Thermal shock resistance | B | B | B | B | B | B | B | B | B |
|  | Peeling resistance | B | B | B | B | B | B | B | B | B |

TABLE 5

|  |  | Comparative Example 1 | Comparative Example 2 | Comparative Example 3 | Comparative Example 4 | Comparative Example 5 |
|---|---|---|---|---|---|---|
| Substrate | Material | Al2O3 | Si—SiC | Si—SiC | Al2O3 | Al2O3 |
|  | Porosity of skeleton (%) | 36 | 0.7 | 18 | 36 | 36 |
|  | Void ratio of three-dimensional network structure (%) | 32 | 25 | 32 | 61 | 94 |
|  | SiC content (% by mass) | — | 41.1 | 73.5 | — | — |
|  | Metal Si content (% by mass) | — | 58.7 | 26.3 | — | — |
|  | Shape of heat storage member | Square having a side length of 150 mm, Thickness 10 mm, Plate | | | | |
|  | Ratio of skeleton density | 9 | 15 | 9 | 4 | 4 |
| Heat storage material | Type of heat storage material | CaO | CaO | CaO | CaO | CaO |
|  | Particle size of heat storage material | 1 μm | 1 μm | 1 μm | 1 μm | 1 μm |
| Evaluation | Strength | C | A | C | C | C |
|  | Rate of temperature rise | C | C | C | C | C |
|  | Thermal shock resistance | C | C | C | C | C |
|  | Peeling resistance | B | B | B | B | B |
|  |  | Comparative Example 6 | Comparative Example 7 | Comparative Example 8 | Comparative Example 9 | Comparative Example 10 |
| Substrate | Material | Si—SiC | Si—SiC | Mullite | Cordierite | Nickel alloy |
|  | Porosity of skeleton (%) | 0.8 | 0.6 | 0.7 | 0.6 | — |
|  | Void ratio of three-dimensional network structure (%) | 25 | 25 | 32 | 32 | 61 |
|  | SiC content (% by mass) | 63.6 | 92.1 | — | — | — |
|  | Metal Si content (% by mass) | 36.2 | 7.7 | — | — | — |
|  | Shape of heat storage member | Square having a side length of 150 mm, Thickness 10 mm, Plate | | Diameter 100 mm, Axial length 100 mm Round pillar | | |
|  | Ratio of skeleton density | 15 | 15 | 9 | 9 | 1 |
| Heat storage material | Type of heat storage material | CaO | CaO | CaO | CaO | CaO |
|  | Particle size of heat storage material | 1 μm | 1 μm | 1 μm | 1 μm | 1 μm |
| Evaluation | Strength | A | A | C | C | A |
|  | Rate of temperature rise | C | C | C | C | C |
|  | Thermal shock resistance | C | C | C | C | A |
|  | Peeling resistance | B | B | B | B | C |

(Evaluation Results)

With regard to the evaluation on the "strength", "rate of temperature rise", "thermal shock resistance", and "peeling resistance", the evaluation "A" or "B" could be obtained in all Examples 1 to 28. On the other hand, the evaluation "C", the worst evaluation among the 3-point scale, was obtained in Comparative Examples 1 to 10 with regard to any of the "strength", "rate of temperature rise", and "thermal shock resistance".

A heat storage member according to an embodiment of the present invention can be used for recovering and storing heat and for reusing the recovered and stored heat. For example, the heat storage member herein can be utilized to support heating a catalyst for disposing exhaust gas when starting an engine of an automobile and the like. Furthermore, the heat storage member herein can be utilized for a heater inside a cabin (indoor) of the automobile.

DESCRIPTION OF REFERENCE NUMERALS

1: core part (core part of skeleton), 3: surface layer part (surface layer part of skeleton), 4: skeleton part (skeleton part of urethane foam), 5: void part (void part of urethane foam), 7: metal si, 9: sic slurry formed body, 10: substrate, 10a: sic sintered body, 11: first end face, 12: second end face, 13: skeleton, 14: three-dimensional network structure, 15: void (void in three-dimensional network structure), 20: heat storage material, 100: heat storage member.

What is claimed is:

1. A heat storage member comprising:
   a substrate containing a SiC sintered body as a principal ingredient; and
   a heat storage material configured to store and radiate heat by a reversible chemical reaction with a reaction medium, or
   a heat storage material configured to store and radiate heat by physical adsorption to a reaction medium and physical desorption from a reaction medium;
   wherein the substrate has a three-dimensional network structure including a skeleton having porosity of 1% or less, a void ratio of the three-dimensional network structure of the substrate is ranging from 30 to 95%, and the heat storage material is disposed at least in a part of a surface of a void in the three-dimensional network structure of the substrate, and
   wherein the three-dimensional network structure has a metal Si core and a SiC surface layer.

2. The heat storage member according to claim 1, wherein the substrate has a content ratio of SiC in the skeleton ranging from 40 to 99.7% by mass, excluding an impure ingredient inevitably contained in a raw material.

3. The heat storage member according to claim 1, wherein a content ratio of metal Si in the skeleton is ranging from 5 to 60% by mass.

4. The heat storage member according to claim 1, wherein the three-dimensional network structure includes a first end face and a second end face opposing each other, a density of the skeleton included in the three-dimensional network structure differs between a first cross section including a direction from the first end face to the second end face and a second cross section including a direction perpendicular to the first cross section, and the density of the skeleton in a cross section having higher density of the skeleton among the first cross section and the second cross sections is 1 to 10 times as large as the density of the skeleton in a cross section having lower density of the skeleton.

5. The heat storage member according to claim 1, wherein the skeleton included in the three-dimensional network structure includes a protrusion in a surface of the skeleton.

6. The heat storage member according to claim 1, wherein the heat storage material includes at least one selected from the group consisting of oxides of Mg, Ca, Sr, Ba, hydroxides of Mg, Ca, Sr, Ba, carbonates of Mg, Ca, Sr, Ba, chlorides of Mg, Ca, Sr, Ba, sulfates of Mg, Ca, Sr, Ba, and zeolite.

7. The heat storage member according to claim 1, wherein the heat storage material is a particulate having an average particle diameter ranging from 5 nm to 100 μm.

8. The heat storage member according to claim 1, wherein a surface layer of the substrate includes a surface layer containing an ingredient different from that of the substrate.

9. The heat storage member according to claim 1, wherein the substrate contains a Si—SiC sintered body as a principal ingredient, and wherein the three-dimensional network structure has a core of metal Si as a principal ingredient and carbon, and a surface layer facing the void and having SiC as a principal ingredient and metal silicon.

* * * * *